July 14, 1970 C. A. KEEDWELL 3,520,416
LIQUID AND GAS-PERMEABLE MICROPOROUS MATERIALS AND
PROCESS FOR MAKING THE SAME
Filed Feb. 12, 1968 2 Sheets-Sheet 1

United States Patent Office 3,520,416
Patented July 14, 1970

3,520,416
LIQUID AND GAS-PERMEABLE MICROPOROUS MATERIALS AND PROCESS FOR MAKING THE SAME
Cyril A. Keedwell, Jericho, N.Y., assignor to Pall Corporation, Glen Cove, N.Y., a corporation of New York
Filed Feb. 12, 1968, Ser. No. 704,747
Int. Cl. B01d 39/16
U.S. Cl. 210—490                                    21 Claims

ABSTRACT OF THE DISCLOSURE

Microporous materials are provided that are capable of passing liquids at low differential pressure while at the same time passing gasses even though the materials are wet with or even saturated with a liquid. This unusual characteristic is obtained by providing two kinds of pores through the material, one kind that are preferentially wetted by the liquid, and one kind that are not, and as a consequence do not absorb enough liquid to be plugged with liquid, and therefore are available for passage of gas therethrough.

A process also is provided for preparing such microporous liquid- and gas-permeable materials, which comprises treating a proportion of the through pores thereof with a liquid-repellent or liquid-wetting material. The selected pores can be in a single region or zone, or in a plurality of regions or zones, in a pattern that can be random or regular, but preferably are so located that gas entrained or suspended in the liquid to be passed therethrough cannot fail to reach such pores.

This invention relates to microporous materials having through pores, of which a portion are preferably wetted by a liquid, and a portion resist such wetting, and therefore are capable of passing gases suspended in such liquids; and more particularly to materials having ultrafine or micro pores and especially adapted for use as filter media, that have two kinds of pores, of which one can pass liquids, and one gases, and to a process for preparing such materials. The preferred materials comprise filter materials characterized by pores extending from surface to surface whose diameter is $15\mu$ or less, a portion of which are preferentially wetted by a liquid to be passed therethrough, and a portion of which resist such wetting.

Of the most difficult types of filter media to manufacture, one is a filter having ultrafine or micro pores, i.e., pores whose diameter is $15\mu$ or less. Such filters must have substantially no pores whose diameter is beyond the permissible maximum, and this, in view of the small size thereof, is a difficult requirement to meet. Microporous membrane filters have been developed such as, for example, those described in U.S. Pat. Nos. 1,421,341 to Zsigmondy, 1,693,890 and 1,720,670 to Duclaux, 2,783,894 to Dovell et al., 2,864,777 to Robinson, and 2,944,017 to Cotton.

Filter media made of particulate material, particularly of fibrous particles deposited on a porous base are described in U.S. Pat. Nos. 3,238,056, 3,246,767 and 3,353,682. The products described include media having a maximum pore sizes as small as 0.35 micron and smaller. Other fine filters can be prepared by other processes, for example by weaving very fine filaments or wires, sintering metal powders together, and/or to a support mesh and by other methods as well.

Despite the very small pore size, many of the products described in the preceding paragraphs exhibit very high flow through rates when water is passed through them at low differential pressures, and hence are extremely useful in liquid filtration.

It is characteristic of porous materials having fine pores that once wetted by a liquid, they will not pass gases except at very high differential pressure. For example, when one of the above described filter media which passes no particles larger than 0.4 micron is selected and this medium is then wetter with water, air cannot be passed through the wet filter at differential pressures below 10 p.s.i. For some similar media air cannot be passed at pressures below 30 p.s.i. Similarly, some filter media which pass liquids while retaining all particles larger than 3 microns, will not pass any air at differential pressures as high as 1 to 3 p.s.i.

The characteristic pressure at which the first bubble of air appears when such a filter is pressurized while immersed just under the surface of a liquid is defined as its "bubble point." The "bubble point" effect is well known from Pat. No. 3,007,334, dated Nov. 7, 1961. In accordance with that patent, there are provided a method and apparatus by means of which the maximum pore sizes of filter elements can be determined not only with extreme accuracy but in a short time. This test is employed in this application and in the claims appended hereto, as well, and the terms "pore diameter," or "pore size," whether referring to maximum pore diameter or size, or average pore diameter or size, are not intended to refer to a specific physical measurement but rather to a value calculated from the bubble point data or other procedures described hereinafter.

The impermeability to air of the wetted filter medium poses serious problems in many applications. For example, it is frequently necessary that a filter wet with such liquid pass a gas, so as to vent a line or equipment, before a liquid to be filtered can be passed therethrough. For example, prior to the administration of parenteral liquids, it is necessary to remove all air from the equipment which might otherwise be injected into the patient with harmful results; however, if the system contains a filter which becomes wet before all the air has been removed from the connecting tubes, there is usually not enough differential pressure available to force the air through the wetted filter. Consequently, the air can form a permanent block to the passage of liquid through the filter. It is frequently found that in liquid processes which involve filtration of a liquid during transfer from one batch tank to another, air may be drawn into the filter housing at the end of each batch transfer, necessitating an air release system of some type. This is particularly troublesome with sterilizing filters having pores of less than $1\mu$, where, since the pressure differential needed to force the air through the filter can be as high as 30 p.s.i.d. of water, in aqueous systems complete filter blockage can result. Another instance is where filters must be steam sterilized or hot water sanitized before use, and are therefore wetted completely with water before use. For some uses, these microporous materials should not only remove microorganisms from liquids but should also pass gases and immiscible liquids entrained in or suspended in such liquids, such as in the simultaneous filtration of a gas and a condensate, or filtration of carbonated beverages, or filtration of bubble tower effluents.

Another such application involves providing bacteria free air for biochemical or fermentation processes such as the manufacture of penicillin. In such a process, air is pumped through a filter capable of bacteria removal into the fermentation tank. The spent air from the tank exits via another filter also capable of bacteria removal. These filters are customarily steam sterilized before use, so that the elements are wet and liquid water is present to some extent in the filter vessel. Water may be present in the influent air, and both this water and some splash carryover may be present in the effluent air. The liquid water must be able to pass through the filter to keep from blocking it, and the air must be able to pass through at a low pressure drop to keep the air blower power requirements within economical limits and avoid the requirements for high pressure fermentation vessels. Typically, the bacteria removing filters required for this application require a pressure of 25 p.s.i.d. to pass the required air flow when wetted, but will pass the same air flow when dry at less than 1 p.s.i. This problem cannot be overcome by using hydrophobic filter media, i.e., media that are not wetted by aqueous liquids, since such media will not pass aqueous liquids except at high differential pressures. For example, a hydrophobic filter medium which retains 0.4 micron particles will not pass any water at differential pressures as high as 10 to 15 p.s.i.d., and thus, the pores of the filter could be blocked by water at pressures less than 10 to 15 p.s.i.d.

In accordance with the instant invention, microporous materials are provided that are capable of passing gases even though the materials are wet with or saturated with a liquid. This unusual characteristic is obtained by providing two kinds of pores through the material, one kind that are wetted preferentially by the liquid, and one kind that are not preferentially wetted by the liquid, and which as a consequence are not blocked by the liquid, but are available for passage of gas therethrough, at a low differential pressure across the material, less than the bubble point of the material when immersed in the liquid.

The microporous materials, simultaneously permeable both to liquids and gases, of the invention accordingly have a maximum pore size of less than about 15$\mu$, and preferably less than about 3$\mu$; a high permeability to liquids, through pores wetted by such liquids; a high permeability to gases, through the pores not wetted by such liquids; and preferably a high voids volume, generally at least 50%. They have any desired relative proportions of liquid-wetted and liquid-repellent pores, according to the relative proportions of liquid and gas to be passed therethrough, within the range from about 0.1:99.9 to about 99.9:0.1. When used principally to pass liquids, and to vent small quantities of gases, the proportion of liquid-repellent pores usually does not exceed 30% of the total pores, and preferably is less than 10%. When used principally to pass air or other gas, while permitting passage of a small amount of liquid at low differential pressure, these proportions are usually reversed, such that the major part of the filter area is water repellent.

The invention also provides a process for preparing such microporous liquid- and gas-permeable materials from microporous substrates, which comprises treating a proportion of the through pores thereof so as to convert them into a kind different from the kind they are, so as to obtain the two kinds of pores therein. This can be done by treatment thereof with a liquid-repellent or liquid-wetting material. If the substrate is wetted by the liquid, a liquid-repellent material is used; if it is not wetted by the liquid, a liquid-wetting material is used. One or a plurality of zones can be treated, and the treatment can be applied in a pattern that can be random or regular. The zone of liquid-repellent pores preferably is located such that gas entrained or suspended in the liquid to be passed therethrough cannot fail to reach it.

The invention is applicable to microporous materials of any type, whose pores are less than about 15$\mu$ in size, such as the microporous membrane filters described in U.S. Pats. Nos. 1,421,341 to Zsigmondy; 1,693,890 and 1,720,670 to Duclaux; 2,783,894 to Dovell et al.; 2,864,777 to Robinson; and 2,944,017 to Cotton, ceramic filters, and the microporous materials of U.S. Pats. Nos. 3,238,056 and 3,246,767 and 3,353,682, referred to above. Woven filter materials of fine metallic or nonmetallic filaments as well as composites of bonded metal fibers or powder can also be used, provided these filter materials have a pore size less than about 15$\mu$.

The proportion of pores that are not wetted by the liquid being filtered, i.e., that are liquid-repellent, depends upon the relative volumes of gas and liquid, and the viscosity of the liquid. Gases have a lower friction, and penetrate small pores more readily, than liquids, and thus it usually is not necessary to reserve more than 30% of the pores for gas passage, although as much as about 99.9% can be reserved, if desired, if the fluid being filtered is primarily gaseous. For small proportions of gas, it usually is best to reserve a low proportion of liquid-repellent pores, less than 10%. It is not practical, in many cases, to reserve less than about 1%, because of the difficulty of locating such a small proportion in the filter where they can be found by the gas, but if the filter is properly shaped, so as to convey the gas to the treated zone, as little as about 0.1% can be used. For instance, in a disk-shaped or funnel-shaped filter, the zone can be located at the apex of the disk or funnel cone, and/or at the periphery.

Thus, the location of the liquid-repellent pores is such, taking into account the configuration of the filter, that the gas will move along the surface of the filter until it reaches them. In a disk or conical filter, the location is preferably at the apex, and/or at the periphery. In a corrugated cylinder, the liquid-repellent pores can be situated at the apices and/or bases of the corrugations. Several exemplary locations are shown in the drawings.

The liquid-repellent pores can be in a regular or in a random pattern, in bands, lines, circles, squares, ellipses, rectangles, triangles, polygons, or other shapes of zones. In most filters they can be located as cross or transverse zones, parallel zones, concentric zones, diagonal zones, an H- or grid-pattern of zones, and combinations of any of these.

Liquid repellency is obtained, if the filter is of a material that is wetted by the liquid, by treatment of the selected liquid-repellent zones with a material that repels the liquid when disposed on the surfaces of the pore walls of the filter material. The repellent material can be applied from a solution or dispersion thereof, in a solvent or dispersant, which desirably includes a binder, to retain the repellent on the pore wall surfaces, unless the repellent is reactive therewith, and can bond itself thereto.

The application can be by printing, spraying, coating, impregnating, dipping, or by exposure to a vapor, such as that of a low boiling silicone compound. It is necessary to use a technique that results in thorough treatment of the entire length of the pores, from surface to surface of the filter material. This requires impregnation of the wall surfaces of the pores from end to end, best achieved by allowing the solution or dispersion of the repellent to flow into and through the pores in the treated zone, by capillarity or by pressure application.

It will be appreciated that in nonwoven substrates, such as paper, nonwoven batts, and microporous layers formed by laydown from a fluid dispersion, the through pores that extend from one surface to another are composed of interconnected pores which are the interstices between the particulate material of which the material is made. During the treatment, some treating material may be used up in pores that intersect or connect with interconnected pores and do not lead through the substrate, but this is not deleterious.

The amount of repellent that is required depends upon the effectiveness of the material as a repellent, and the volume of pores being treated. Usually less than 25% by weight of the zone volume being treated and preferably from 0.025% to 15% by weight of the zone volume is sufficient.

The repellent is chosen according to the liquid suspending medium being filtered. It must repel such liquid, or be rendered so in situ on the pore surface.

For a hydrophobic or water-repellent surface, there can be used silicone resins and silicone oils of the general type $R_n$—Si—O—Si—$R_n$, where $n$ is 1 or 2, $n$ is 1 in the case of the fluids, and $n$ is 2 in the case of the solids, which contain cross-link between chains. Mixtures containing species in which $n$ is from 1 to 3 can also be used. R is a hydrocarbon group having from one to eighteen carbon atoms.

Also useful are the quaterinary ammonium salt derivatives of silicon compounds described in U.S. Pat. No. 2,738,290, dated Mar. 13, 1956. These are substantive to cellulosic filter materials, as noted in the patent. Also, the hydrophobic oils and waxes can be used, in appropriate circumstances, where they can be made permanent.

If the filter material is already liquid-repellent to some degree, it may be advantageous to apply a liquid-wetting material to the zones to serve for passage of liquid, so as to reserve the untreated zones for gas. The liquid will preferentially wet the zones treated with a wetting agent, and the untreated zones will thus remain available for gas. The same treatment principles and proportions apply to liquid-wetting materials as to liquid-repellent materials. Typical wetting agents that are suitable are polyvinyl alcohol, alkyl aryl polyether alcohols, melamine formaldehyde resins, and the like. These wetting agents can be applied from a dispersion or emulsion.

The fluid medium used is preferably inert to the filter material to be impregnated. The fluid should be volatile at a reasonably elevated temperature below the melting point of the material to facilitate removal after application. However, nonvolatile fluids may be desirable under certain conditions, and those can be removed, as is more fully described later, by washing out with a volatile solvent. The fluid can be the liquid to be filtered by the impregnated material.

Typical fluids are water, polyalkylene glycols, such as polyethylene glycols, poly 1,2-propylene glycols, and mono and dialkyl ethers thereof, such as the methyl, ethyl, butyl and propyl mono and di ethers, dialkyl esters of aliphatic dicarboxylic acids, such as di-2-ethylhexyl adipate and glutarate, mineral lubricating oils, hydraulic fluids, vegetable oils, and organic solvents such as xylene, chloro, bromo and fluoro hydrocarbons, such as the Freons, and petroleum ethers. Since the impregnated material is potentially useful to filter any liquid, depending upon the choice of particulate material, obviously a wide selection of fluids is available, and such would be known to one skilled in this art.

In order to aid in penetration of the filter material, a wetting agent which wets the material can be incorporated. If a dispersing agent is used, this should also serve as a wetting agent for the base, and therefore should not only disperse the particulate material but should also wet the base material. If no dispersing agent is used, a wetting agent may be desirable.

From 0.001 to 5% of a wetting agent is usually sufficient. Anionic, nonionic and cationic wetting agents can be used; preferably, the wetting agent should not have an affinity for the base, so that it can be rinsed off easily with the slurry fluid or some other solvent after impregnation.

There can be incorporated a bonding agent or binder for anchoring the liquid-repellent or liquid-wetting material in the pores of the impregnated material. This is especially desirable when liquid-repellent or liquid-wetting materials are used in small amounts. Beater addition binders used in the paper industry can be employed. Alternatively, the bonding agent or binder may be flowed through the impregnated base as a final operation, or it may be added to the suspension in the form of thermoplastic material, particles or fibers, such as the fibrids and fibers of polyvinyl chloride, nylon, polyacrylonitrile esters of terephthalic acid and ethylene glycol, cellulose acetate, and polyethylene. The binder can also be incorporated in the impregnated base after deposition, if it has a deleterious effect upon the slurry. It can for example be washed through the layer after the fluid has been drawn off.

The binding agent employed must be a liquid or capable of being liquefied at the time adhesion is to be effected, and thereafter must be capable of undergoing solidification, as by polymerization, cross-linking, evaporation of a solvent, cooling, or the like. Liquid thermosetting resins are particularly advantageous, since they are effective in low concentrations and can be maintained in liquid form until it is desired to cause them to solidify. Representative liquid thermosetting resins include phenol-formaldehyde resins, urea-formaledhyde resins, melamine-formaldehyde resins, polyester resins and polyepoxide resins.

The liquid polyepoxide resins are particularly preferred. The polyepoxides that can be used in this invention can be saturated or unsaturated, aliphatic, cycloaliphatic, aromatic or heterocyclic and may be substituted if desired with substituents, such as chlorine atoms, hydroxyl groups, ether radicals, and the like. They may also be momomeric or polymeric.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1,4-bis(2,3-epoxypropoxy) benzene, 1,3 - bis(2,3-epoxypropoxy)benzene, 4,4'-bis(2, 3-epoxypropoxy)diphenyl ether, 1,8 - bis(2,3 - epoxypropoxy)octane, 1,4 - bis(2,3 - epoxypropoxy)cyclohexane, 4,4' - bis(2 - hydroxy-3,4-epoxybutoxy)diphenyldimethylmethane, 1,3-bis(4,5-epoxpentoxy)-5-chlorobenzene, 1,4-bis(3.4-epoxybutoxy)-2-chlorocyclohexane, 1,3-bis(2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen-containing epoxide or a dihalohydrin in the presence of an alkaline medium. Polyhydric phenols than can be used for this purpose include among others resorcinol, catechol, hydroquinone, methyl resorcinol, or polynuclear phenols, such as 2,2-bis(4-hydroxyphenyl)-propane (bisphenol A), 2,2-bis(4 - hydroxy-phenol)-butane, 4,4' - dihydroxybenzophenone, bis(4 - hydroxyphenyl) ethane, 2,2,-bis(4-hydroxy-phenyl)pentane, and 1,5-dihydroxynaphthalene. The halogen-containing epoxides may be further exemplified by 3-chloro-1,2-epoxybutane, 3-bromo - 1,2-epoxyhexane, 3-chloro-1,2-epoxyoctane, and the like.

The monomer products produced by this method from dihydric phenols and epichlorohydrin may be represented by the general formula

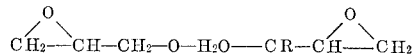

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol, $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The preferred glycidyl polyethers of the dihydric phenols may be prepared by reacting the required proportions of the dihydric phenol such as Bisphenol A and the epichlorohydrin in an alkaline medium. The desired alkalinity is obtained by adding a basic substance, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Any known type of curing agent can be employed in conjunction with the polyepoxide resins. For example, organic amines and quaternary ammonium compounds as in U.S. Pat. No. 2,506,486, acidic organic orthophosphates as in U.S. Pat. No. 2,541,027, sulfonic acid or sulfonyl halides as in U.S. Pat. No. 2,643,243 and acid anhydrides either alone or with activators as in U.S. Pat. No. 2,768,153. The organic amines are particularly preferred since they give the fastest rate of solidification. Aliphatic amines such as dimethylamine, trimethylamine, triethylamine, 1,3 - diamino - propane, hexamethylene diamine, diethylene triamine, triethylene tetraamine, octylamine, decylamine, dioctylamine, and dodecylamine are exemplary of primary, secondary and tertiary aliphatic amines. The aliphatic amines preferably have from one to twelve carbon atoms. Also useful are the aromatic amines such as phenylene diamine, di(methylaminomethyl)phenol, tri(dimethylaminomethyl)phenol, and diethylaniline.

The acid anhydrides are also quite useful as curing agents. These compounds are derived from mono or preferably, polycarboxylic acids, and possess at least one anhydride group.

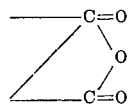

Z represents the carboxylic acid residue, and may be a saturated or unsaturated aliphatic, cycloaliphatic, aromatic or heterocyclic group. Exemplary are phthalic anhydride, maleic anhydride, "Nadic" methyl anhydride, succinic anhydride, chlorosuccinic anhydride, 6-ethyl-4-cyclo-hexadiene-1,2 - dicarboxylic acid anhydride, dodecenyl succinic acid anhydride, tetrahydrophthalic acid anhydride, pyromellitic dianhydride, and the like. Other anhydrides which can be used will be found mentioned in U.S. Pat. No. 2,768,153.

Also applicable as binding agents are solutions of solid thermosetting resins in suitable solvents.

Theromoplastic solid binders can also be employed provided they can be softened to a tacky state, or liquefied, as by heating to above their softening point, to effect adhesion. Such thermoplastic materials can be employed alone or in solution in a suitable solvent. Typical thermoplastic binders include polyethylene, polypropylene, polymethylene, polyisobutylene, polyamides, cellulose acetate, ethyl cellulose, copolymers of vinyl chloride and vinyl acetate, polyvinyl chloride, polyvinylidene chloride, polyvinyl butyral, polytetrafluoroethylene, polytrifluorochoroethylene, lignin-sulfonate resins, starch binders, casein binders, and terpene resins, polyacrylic resins, such as polymethyl methacrylate, alkyd resins, and synthetic rubbers such as butadiene-styrene polymers.

The solvent dispersing fluid used in preparing the solution or dispersion can be any fluid which is inert under the conditions of use, such as any of the fluids referred to above.

In preparing the solution or dispersion, the binding agent is preferably mixed with the liquid-repellent or liquid-wetting material, and the mixture is then added to the dispersing liquid with agitation, to create a stable dispersion or solution.

An alternative method of preparing the solution involves the use of binding agent dissolved in a suitable solvent. The binding agent and liquid-repellent or liquid-wetting material are insoluble in the dispersing fluid while the solvent is soluble therein. The liquid-repellent or liquid-wetting material and the binding agent solution which can be premixed if desired, either in whole or in part, are added to the dispersing fluid. The solvent dissolves in the dispersing fluid causing the precipitation of the liquid-repellent or liquid-wetting material, and the binding agent on the filter material. The viscosity of the fluid dispersion is sufficient to prevent any of the binding agent or particulate material from settling out before application to the filter material.

The solution or dispersion should preferably contain from about 0.1 to 5 parts by weight of liquid-repellent or liquid-wetting material per 100 parts by weight of dispersing liquid and from 8 to 2000 parts by weight of binding agent per 100 parts by weight of particulate material, preferably at least about 200 parts of binding agent per 100 parts of particulate material.

Sufficient solution or dispersion should be applied to the filter substrate to deposit from about ½ to 100% by weight of liquid-repellent or liquid-wetting material and from about ½ to about 100% by weight of binding agent, per cubic foot of the pore volume in the treated area of the substrate.

After the application has been completed, adhesion may need to be effected. The conditions necessary to accomplish this vary with the nature of the binding agent. For example, the temperature can be raised to a point high enough to cause the cross-linking or polymerization of the binding agent or to cause the evaporation of the solvent in which the binding agent is dissolved. Alternatively, where a thermoplastic material is used as the binding agent the temperature can be increased to effect softening or fusion. A catalyzed resin can be allowed to stand at room temperature until the resin is set.

If it is necessary to raise the temperature of the treated product to cure or soften the binder, a curing oven can be provided, through which the base is passed after the deposition. The treated base can also be dried in this oven, if desired, to remove any remaining portion of the dispersing fluid. Alternatively, the binding agent can be caused to solidify by passing heated air or other heated gases through the treated product.

Figure 1:
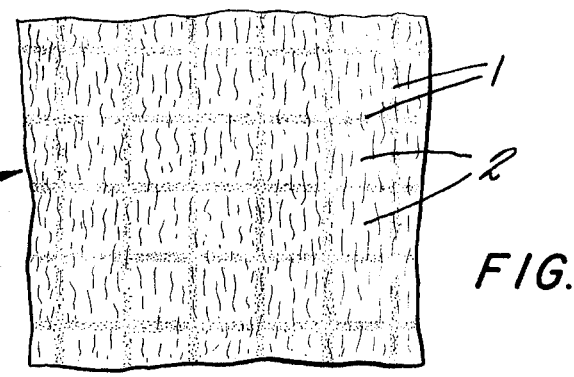
FIG. 1 is a view of a portion of the upper surface of a microporous filter material of the invention in sheet form, showing the liquid-repellent zone as a square grid of intersecting narrow bands.

These figures represent the products produced in accordance with Examples I to X, inclusive, and a detailed description thereof will be found in those examples, which represent preferred embodiments of the invention.

The invention is of particular application to porous filter bases formed in pleats, convolutions or corrugations, on which the microporous layer is deposited. In such cases, the porous filter base can comprise a resin-impregnated cellulosic material.

The relationship between pressure differential across the treated filter materials of the invention and air flow was evaluated by the following test which is an extension of the procedure of U.S. Pat. No. 3,007,334, used to determine bubble point and port size or diameter.

A disk of the material to be tested is wetted with a liquid, such as water or ethyl alcohol, and then clamped between rubber gaskets. A screen may be positioned above the disk to support it against upward movement. A thin layer of fluid covers the disk. Air pressure is gradually increased in the chamber below the disk and the air flow through the disk is measured. Pressure is then gradually increased in increments and the air flow measured for each increment. The air flow is divided by the unmasked disk area to calculate air flow in cc./in.$^2$.

EXAMPLE I

A microporous filter material in sheet form was prepared, following the procedure of Example I of U.S. Pat. No. 3,353,682. The average pore size was 0.1 micron and the maximum pore less than 0.35 micron as determined by 100% removal of the bacteria, *Serratia marcescens*.

An aqueous fiber dispersion was prepared containing 5.4 g./l. of crocidolite type asbestos fibers having an average diameter of 0.5 micron and an average length of 300 microns and 0.6 g./l. of crocidolite fibers having an average diameter of 0.5 micron and an average length of 1500 microns, by agitation in a high shear mixer having a rotor diameter of 7 inches, at a speed of 1800 r.p.m.

An amyl acetate binder solution was prepared containing 4.75% by weight of neoprene, 0.2% by weight magnesium oxide and 0.24% by weight of zinc oxide, 0.05% by weight of tetraethylthiuram disulfide as a curing agent, 0.05% sodium dibutyl dithiocarbamate as a curing agent, 0.11% by weight of phenyl-β-naphthylamine as a stabilizer, and 94.7% by weight amyl acetate.

This was blended into the fiber slurry at the region of highest shear in a ratio of neoprene to fibers of 15:100. Neoprene was thereby deposited on the fibers, so that the fibers were coated with about 15% by weight neoprene.

A thin cellulose paper having a thickness of 0.0045 inch and a weight of 2.65 g./ft.$^2$ was placed on the foraminous belt of a Fourdrinier machine, and served as the foraminous base support for laydown of the microporous material. The paper was used as the base rather than the mesh to ensure a smooth surfaced fine base layer. The paper was stripped from the microporous material after it had been laid down, and before curing.

The dispersion of fibers and binding agent was then flowed upon the paper support, and the resulting turbulence deflocculated some fibers while some liquid drained out by gravity, thereby forming a thin first microporous layer of deflocculated fibers about 0.001 inch in thickness, of the mixed asbestos fibers, in which the fibers lay almost entirely in planes approximately parallel to the plane of the layer, and having an average pore diameter of 0.1 micron, and a maximum pore diameter of 0.35 micron. The flow through the support slowed as the layer formed, and the fibers in the supernatant liquid reflocculated. The belt was passed under a doctor blade which broke up excessively large flocs in the supernatant dispersion. Thereafter, a vacuum of 15 inches of mercury was applied on the underside of the foraminous belt, causing the supernatant dispersion to flow through the thin layer, depositing the remaining mixed asbestos fibers on the thin layer, under pressure flow, and forming a coarse layer having an average pore diameter of 0.25 micron, a maximum pore diameter of 0.55 micron and a thickness of about 0.004 inch.

The bilayered sheet so formed had a thickness (uncompressed) of 0.006 inch, and was dried under infrared lamps, and then oven-cured for 20 minutes at 310° F. It had a water permeability of 10 gallons per minute per square foot at an applied pressure differential of 15 p.s.i. The voids volume of the relatively coarse layer was found to be about 84%, and for the thin layer, it was 60%.

This material was then treated with General Electric's SF99 silicone resin to form a grid pattern of treated areas, as shown in FIG. 1, with bands 1, each 2 mm. wide, separating untreated square areas 2, each 1 cm. x 1 cm. square, so that about 30% of the area was thus treated. The treatment was carried out by printing the pattern on the sheet of filter material 3, using a 2½% solution of SF99 silicone resin solution with lead isooctoate catalyst in trichloroethylene, followed by evaporation of the solvent, and curing the resin at 300° F. for 30 minutes. The deposition rate was approximately 0.02 cc. of solution per square centimeter of filter material in lines 1 mm. wide. These lines spread by capillarity to form band zones approximately 2 mm. in width which extended to the opposite side of the material. The dry permeability of the material at 28 cu. ft. per minute of air per square foot was unchanged by the treatment.

The treated zones were permanently water-repellent, whereas the remainder of the material was not, and was wetted by water, as it was before the treatment. The water-wetted air permeability was then tested, and compared with the untreated material, using the test procedure described above. The untreated material passed 28 cu. ft. of air/min. per sq. ft. when dry at a pressure drop of 2.5 p.s.i. When saturated with water, negligible air flow occurred up to 12 p.s.i. and 1 cu. ft./min./ft.$^2$ occurred at a 28 p.s.i. differential. The treated material passed 28 cu. ft. of air/min./ft.$^2$ at 2.5 p.s.i. when dry and 1 cu. ft. of air/min./ft.$^2$ at 0.5 p.s.i. when saturated It is evident from these data that the interposition of hydrophobic areas in a grid pattern very greatly reduced the pressure differential required to pass air. Whereas in order to pass 1 cu. ft. of air per minute per square foot, a pressure differential of 28 p.s.i. was required in the untreated control, after saturation in water, only 0.5 p.s.i. was the pressure differential at which was passed the same volume of air after saturation in water by the filter treated in accordance with the invention. Similar results occur at other air flows.

EXAMPLE II

Figure 2:
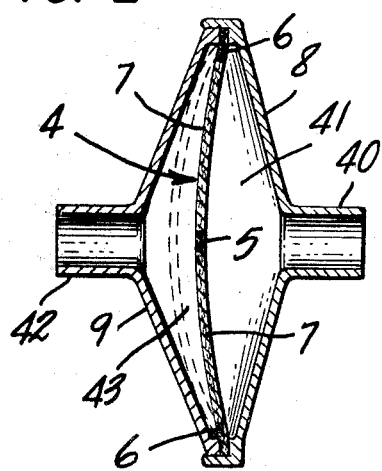
FIG. 2 represents a cross-sectional view through a filter assembly for parenteral use, containing a microporous filter material of the invention in disk form, showing the liquid-repellent zone at the apex and periphery of the disk.

A commercially available fibrous filter sheet of the general type described in U.S. Pat. Nos. 3,353,682, 3,246,767 and 3,238,056 having an average pore size of 0.9 micron and a maximum pore size of 3 microns, sold under the trademark Ultipor and designation .9P was cut into discs 4, as shown in FIG. 2, and the apex 5 and the periphery 6 were each treated by dipping in a 2% solution of Dow Corning RTV–112 silicone resin in perchloroethylene, followed by evaporation of the solvent and curing the resin, which is moisture curing, at room temperature for 12 hours. The peripheral zone 6 treated was annular, 2 mm. in width, and the treated apex zone 5 in the center of the disk was circular, roughly 1 mm. in diameter, while untreated zone 7 was annular 27 mm. wide so that approximately 13% of the area was treated. The zones 5 and 6 were water-repellent, while the untreated zone 7 was not, and was wetted by water, as it was before the treatment.

When subjected to the test described above, the treated disk was found to pass air freely at flows as high as 200 cc. per minute per square inch after saturation in water, with a maximum pressure differential at 100 cc. per minute per square inch of 1.5 inches of water. In contrast, a disk of the untreated sheet required a pressure of 35 inches of water to pass 100 cc. per minute square inch of air, after saturation in water.

The treated disk was then assembled to a filter assembly with a leak-tight seal. The assembly included a housing half 8, with a fluid inlet 40 and an inlet chamber 41 on one side, and a housing half 9, with a fluid outlet 42 and an outlet chamber 43 on the other side. It was found that, no matter in which position the filter was held, it was possible for air to pass through the wetted filter under conditions simulating the administration of a parenteral fluid. This was also true if the flow direction was reversed.

EXAMPLE III

Figure 3:
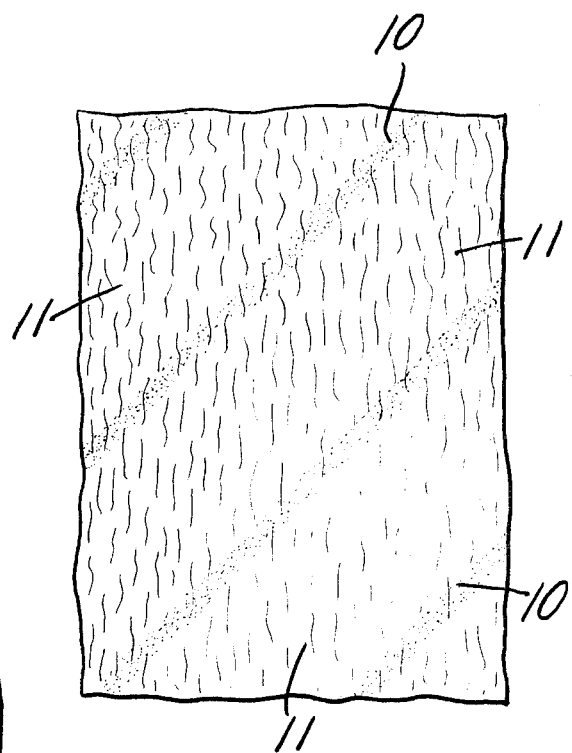
FIG. 3 is a view of a portion of the upper surface of a microporous filter material of the invention in sheet form, showing the liquid-repellent zone as a plurality of diagonal parallel bands.

A filter sheet comprising two layers of the filter material of Example I was printed with the solution of silicone resin employed in Example I. The resin was printed in a series of parallel bands, set diagonally at an angle of 45° to the sides of the sheet, thus producing the sheet shown in FIG. 3. The treated sheet was allowed to dry, and the resin was cured at 300° F. for 30 minutes. The bands 10 were 2 mm. in width when laid down, and grew by capillarity to 4 mm. in width, and from surface to surface of the sheet, after curing of the resin forming band zones that were water-repellent. The untreated areas 11 were 28 mm. wide, and constituted 88% of the sheet area; these were wetted by water, as they were before the treatment. The resultant sheet had an average pore size of $0.1\mu$ and a maximum pore size of $0.2\mu$, as determined by 100% removal of the bacteria, Pseudomonas.

When subjected to the test procedure described above, it was found that the treated material in accordance with this example passed air at flow rates of up to 100 cc. per minute per square inch at pressures below 2.5 inches of water after saturation in water. In contrast, the untreated paper required a pressure of 35 inches of water at 100 cc. of air per minute per square inch after saturation in water.

EXAMPLE IV

Figure 4:
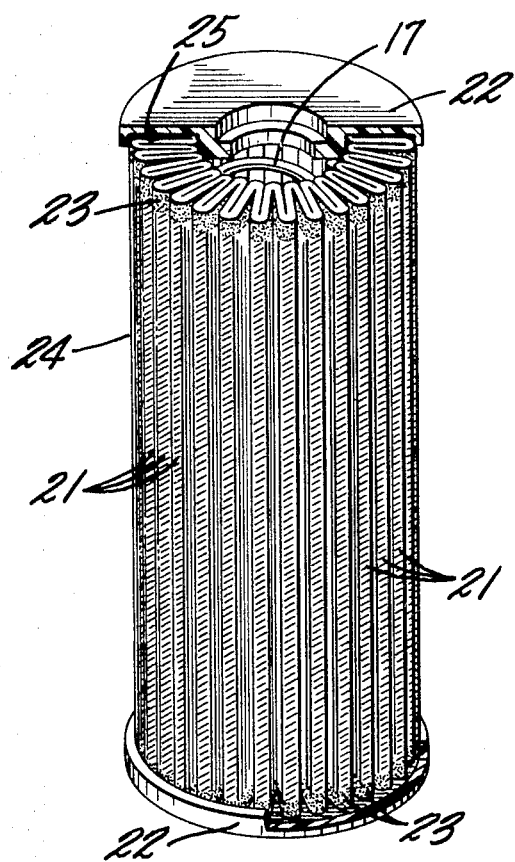
FIG. 4 is an enlarged cross-sectional view, with portions broken away, of a filter of the invention in corrugated form, with the liquid repellent zone at the ends of the corrugations.

The cylindrical pleated filter shown in FIG. 4 was prepared using two layers of filter material made in accordance with Example 12 of U.S. Pat. No. 3,246,767. The element contained the corrugated filter material 21, fastened at its ends to end caps 22 by an epoxy adhesive 25. A spring 17 supported the filter against differential pressure. The element was 9⁷⁄₁₆ inches long, had an inner diameter of 1¾ inches, and an outside diameter of 2¾ inches. Effective filter area was 5.5 square feet. The filter had an average pore size of 0.1 micron and a maximum pore size of 0.35 micron. The element was then treated with a solution of 2½% of General Electric's SF99 silicone resin solution with lead isooctoate catalyst in trichlorethylene, such that the central 90% of the area 24 was rendered water repellent, leaving approximately ½ inch wide bands 23 around each end. After the solvent had evaporated the resin was cured at 300° F. for 30 minutes. The element was then installed in a suitable housing and connected to an air line, provided with a regulator such that the pressure across the element was 1 p.s.i. (which is approximately the pressure drop usually allowed in biochemical and fermentation vat practice). The initial flow was 9.5 s.c.f.m., and the flow remained within 90% of this value despite the passage through the filter element (along with the air) of more than one liter of water (condensed in the compressed air line) during the test period of 48 hours.

When the same test was run using an element having identical characteristics, except not treated for water repellency in accordance with this invention, the volume of air flow fell to less than 10% of the initial flow after approximately 16 hours, and the element when removed was found to be saturated with water.

When the test was run with an element which had been treated such that all of the filter area was water repellent, flow gradually decreased with time as water collected on the upstream surface, and after approximately 24 hours had fallen to less than 10% of the initial flow.

The element used for this example was axially symmetrical so that it could be installed with either end down. Therefore, both ends were left hydrophilic. If the element is such that it can only be installed in one orientation, only the part of the element in the location where liquid will collect, i.e. the lowest end, need be hydrophilic (as in Example VI below). If a number of elements are used, only those elements located where liquid will collect need have hydrophilic portions; the remainder should preferably be hydrophobic.

EXAMPLE V

A microporous filter material was prepared in accordance with Example II above.

Figure 5:
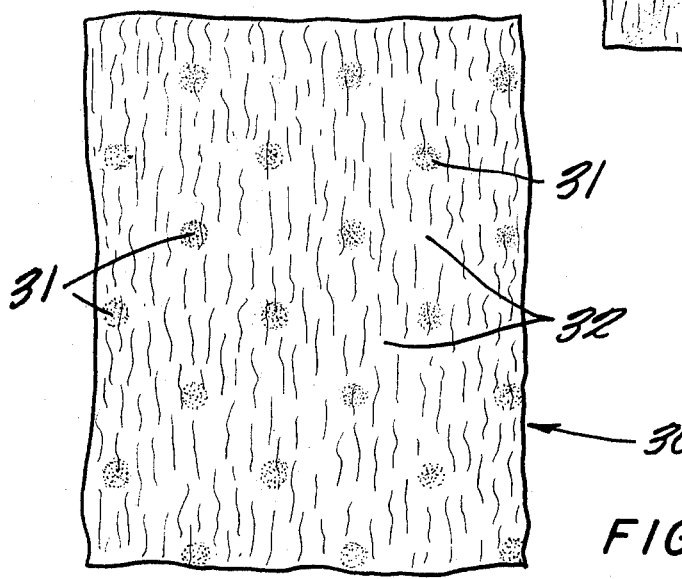
FIG. 5 is a view of a portion of the upper surface of a microporous filter material of the invention in sheet form, showing the liquid-repellent zone as a plurality of circular areas.

Using the procedure of Example I, a regular pattern of circular zones was printed on the sheet with the solution of silicone resin employed in Example I, thus producing the sheet 30 shown in FIG. 5. The treated sheet was allowed to dry, and the resin was allowed to cure at room temperature for twelve hours. The circular zones 31 were 28 mm. apart, and 2 mm. in diameter when laid down. They grew by capillarity to 4 mm. in diameter, and extended from surface to surface through the sheet 30. The untreated zones 32 therebetween constituted about 98% of the sheet. The treated zones 31 were water-repellent, and the untreated zones were not.

When subjected to the test procedure described above, it was found that the treated material in accordance with this example passed air at flow rates of up to 10 cc. per minute per square inch at pressures below 1.5 inches of water after saturation in water. In contrast, the untreated paper required a pressure of 85 inches of water at 10 cc. of air per minute per square inch after saturation.

EXAMPLE VI

Example IV was repeated except that the finished element was treated with a 2½% solution of General Electric's SF–99 silicone resin solution with lead isooctoate catalyst in trichlorethylene. One end of the element was thus treated such that 95% of the area was rendered water repellent. The solvent was evaporated and the silicone resin was cured at 300° F. for 30 minutes after which the air permeability of the treated portions was 28 ft./min. at a differential pressure of 2 p.s.i., but would not become water wetted at pressure differentials up to 25 p.s.i. The untreated end exhibited normal water wettability and had a water permeability of 5 g.p.m./sq. ft. of untreated area at a differential pressure of 15 p.s.i.

The treated element was installed in the simulated penicillin manufacturing system and used in Example IV with the water repellent portion up. Results were identical.

EXAMPLE VII

An acrylonitrile-vinylchloride copolymer membrane cast on and around a nylon fabric support and having a mean pore size of 0.45 micron and a thickness of 140 microns was RTV treated to cover 10% of its area as a series of parallel stripes 1.5 mm. wide on 1 cm. center to center, by the process described in Example II. The flow properties were as follows:

Before RTV treatment

Air flow dry=22 ft./min. at a differential pressure of 1 p.s.i.
Air flow water wetted=20 cc./min./sq. in. at 13 p.s.i. and 1 ft./min. at 18 p.s.i.
Water flow=2.5 g.p.m./sq. ft. at 9 p.s.i.

After RTV treatment

Air flow dry=20 ft./min. at a differential pressure of 1 p.s.i.
Air flow water wetted=20 ft./min. at 9.5 p.s.i.
Water flow=2.1 g.p.m./sq. ft. at 9 p.s.i.

EXAMPLE VIII

The procedure of Example VII was repeated with the same results using a polyethylene emulsion (Poly-em No. 41 nonionic) from Spencer Chemical Division, Gulf Oil Corporation, diluted to 4% solids with equal parts of water and ethanol.

EXAMPLE IX

The procedure of Example VII was repeated with the same results using a vinylidene fluoride dispersion (Kynar) from Pennsalt Chemical Corporation, diluted to 4% solids with equal parts of water and ethanol.

EXAMPLE X

A commercially available hydrophobic fiber glass filter paper having an average pore size of 2 microns and a maximum pore size of 5 microns was treated with a 1% solution of an alkyl aryl polyether alcohol (OPE–5) in acetone so that 50% of the filter medium area was treated. After acetone evaporation, the medium showed no visual evidence of treatment; however, the treated area was now hydrophilic. The flow properties were as follows:

Before treatment

No water flow at 10 inches $H_2O$ differential pressure.

After treatment

½ g.p.m. per sq. ft. water flow at 10 inches $H_2O$ differential pressure. The hydrophobic areas remained permeable to air.

The porous microporous materials of the invention having in combination both liquid-repellent and liquid-wetted pores are useful as filters for separating solid particles from liquids and gases, as gas diffusers, and as porous separators in all types of apparatus employing fluids for any purpose, such as separators in batteries and diaphragm cells. They can be made to have a wide range of porosities below 15 microns to meet any need. For the ultrafine filter media, the pores can, for example, be made small enough to remove bacteria and like minute organisms. They can therefore be used as cold sterilizers to make drinking water and bacteria-free parenteral fluids and pharmaceuticals. They can be used as acoustical absorbers, and in heat and sound insulation.

Having regard to the foregoing disclosure, the following is claimed as the inventive and patentable embodiments thereof:

1. A microporous material permeable to both gases and liquids and capable of passing gases even though wet with or saturated with a liquid, comprising, a microporous material having two kinds of through pores extending from one surface to an opposite surface, of which one kind is preferentially wetted by such liquid, and as a consequence remain open for the passage of such liquid and one kind is liquid-repellent and therefore not preferentially wetted by such liquid, and as a consequence remain open for passage of gas therethrough, even though the material be wet with or saturated with such liquid.

2. A microporous material according to claim 1, having a maximum pore size of less than about 15µ.

3. A microporous material according to claim 1, having a proportion of liquid-repellent pores that does not exceed 30% of the total pores.

4. A microporous material according to claim 1, having a proportion of liquid repellent pores in excess of 70% of the total pores.

5. A microporous material according to claim 1, wherein the material having through pores is a filter sheet material.

6. A microporous material according to claim 5, wherein the filter sheet material is a microporous membrane filter.

7. A microporous material according to claim 5, wherein the microporous material comprises a porous material having relatively large pores within which is deposited particulate material comprising at least 5% fibrous material in an amount to diminish the diameter thereof to less than 15µ over at least a portion of their length between surfaces of the material.

8. A microporous material according to claim 5, wherein the microporous material comprises a porous base having superimposed thereon and adherent thereto a microporous layer impregnating the base to at most a depth of about 100µ comprising a fibrous material of which a portion of fibers extend outwardly from the porous base at an angle greater than 30°, sufficient to impart to said layer a maximum pore diameter of less than 10µ and a voids volume of at least 75%.

9. A microporous material according to claim 1, wherein the liquid-repellent pores are arranged in zones in a random pattern.

10. A microporous material according to claim 1, wherein the liquid-repellent pores are arranged in zones in a regular pattern.

11. A microporous material according to claim 1, wherein the material is in the form of a filter disk, and the liquid-repellent pores are arranged in zones at the central apex and at the periphery of the disk.

12. A microporous material according to claim 1, wherein the material is in the form of a corrugated sheet, and the liquid-repellent pores are arranged in zones at the ends of the corrugations.

13. A microporous material according to claim 1, in which the liquid-repellent pores of the material are coated with a silicone resin.

14. A corrugated filter element capable of passing gases even though wet with or saturated with a liquid, comprising a microporous liquid and gas-permeable material according to claim 1.

15. A corrugated filter element comprising a corrugated filter sheet formed of the material defined by claim 1, wherein the sheet is formed into a cylinder and has end caps bonded to the ends of the cylinder, and in which the liquid-repellent pores are located in at least one zone occupying up to 50% of the cylinder length and located intermediate the end caps.

16. A filter assembly for parenteral fluids comprising a housing having fluid inlet and outlet, and a microporous filter permeable to both liquids and gases positioned in the housing between the inlet and outlet such that flow from the inlet to the outlet passes through the filter; the filter being capable of passing gases even though wet or saturated with a liquid and comprising a microporous material having two kinds of through pores extending from one surface to an opposite surface, of which one kind is preferentially wetted by such liquid, and as a consequence remain open for the passage of such liquid, and one kind is liquid-repellent and therefore not preferentially wetted by such liquid, and as a consequence remain open for passage of gas therethrough, even though the material be wet with or saturated with such liquid.

17. A filter assembly for parenteral fluids in accordance with claim 16 in which the liquid-repellent pores are adapted to remove bacteria from air and the preferentially wetted pores are adapted to remove bacteria from liquid.

18. A filter assembly in accordance with claim 16, wherein the pores of the filter element are sufficiently small to remove all incident particles over 3µ.

19. A microporous material according to claim 10, in which the liquid repellent pores are arranged in zones in a grid pattern.

20. A microporous material according to claim 10, wherein the liquid repellent pores are arranged in a series of lines.

21. A microporous material according to claim 10, wherein the liquid repellent pores are arranged in a pattern of circular zones.

References Cited

UNITED STATES PATENTS 3,224,592  12/1965  Burns et al. _____ 210—508 X
3,371,468  3/1968  Shropshire _____ 55—138

JOHN W. ADEE, Primary Examiner

U.S. Cl. X.R.

55—498, 524, 528; 210—493, 504, 508

UNITED STATES PATENT OFFICE
CERTIFICATE OF CORRECTION

Patent No. 3,520,416      Dated July 14, 1970

Inventor(s) Cyril A. Keedwell

It is certified that error appears in the above-identified patent and that said Letters Patent are hereby corrected as shown below:

In Column 1, line 65 "a" preceding "maximum" should be deleted. Column 2, line 8, "wetter" should be --wetted--; line 19, after "from" insert --U.S.--. Column 5, line 6, "quarterinary" should be --quarternary--; line 3, "link" should be --links--. Column 6, line 47, "than" should be --that--; lines 60 to 62, formula reading:

should be

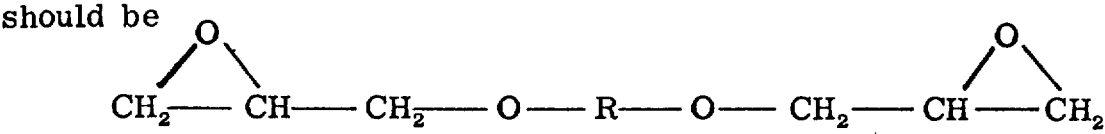

Column 7, line 64, "polytrifluorochoro" should be --polytrifluorochloro---. Column 8, line 4, after "of" insert --a--. Column 14, line 3, "portion" should be --proportion--.

SIGNED AND SEALED
DEC 8 1970

(SEAL)
Attest:

Edward M. Fletcher, Jr.
Attesting Officer

WILLIAM E. SCHUYLER, JR.
Commissioner of Patents